US005720487A

United States Patent [19]

Kato

[11] Patent Number: 5,720,487

[45] Date of Patent: Feb. 24, 1998

[54] WATERPROOF RUBBER PLUG

[75] Inventor: Tetsuo Kato, Shizuoka-ken, Japan

[73] Assignee: Yazaki Corporation, Tokyo, Japan

[21] Appl. No.: 801,526

[22] Filed: Feb. 18, 1997

Related U.S. Application Data

[63] Continuation of Ser. No. 498,406, Jul. 5, 1995, abandoned.

[30] Foreign Application Priority Data

Jul. 7, 1994 [JP] Japan ........ 6-156088

[51] Int. Cl.[6] ........ F16J 15/00; H01R 13/52

[52] U.S. Cl. ........ 277/101; 277/207 R; 439/274; 439/279

[58] Field of Search ........ 439/274, 279, 439/587, 589; 277/101, 207 R, 208

[56] References Cited

U.S. PATENT DOCUMENTS 4,643,506 2/1987 Kobler ........ 439/587
4,895,533 1/1990 Yagi ........ 439/587
5,224,875 7/1993 Watanabe et al. ........ 439/587
5,351,973 10/1994 Taniuchi et al. ........ 439/274

FOREIGN PATENT DOCUMENTS 62-163879 10/1987 Japan .

*Primary Examiner*—Daniel G. DePumpo
*Attorney, Agent, or Firm*—Finnegan, Henderson, Farabow, Garrett & Dunner, L.L.P.

[57] ABSTRACT

A cylindrical waterproof rubber plug to be inserted into a hole formed in a housing is provided. The center of the waterproof rubber plug, has a through-hole into which a wire of outer diameter A is inserted. The plug consists of a main body part and a crimping part of inner diameter B formed integral with the main body part. The dimensions A and B are related by the equation (A−B)/B=0.1~0.8. Thus, even when the wire engaged in the plug is obliquely bent, sufficient sealability can be ensured.

4 Claims, 3 Drawing Sheets

| (A-B)/B | SEALABILITY | EASINESS OF INSERTION |
|---|---|---|
| 0 | × | ○ |
| 0.1 | △ | ○ |
| 0.15 | ○ | ○ |
| 0.20 | ○ | ○ |
| 0.25 ~ 0.75 | ○ | ○ |
| 0.80 | ○ | △ |
| 0.90 | ○ | × |

○:GOOD, ×:NO GOOD, △: A LITTLE BETTER

WATERPROOF RUBBER PLUG

This application is a continuation of application Ser. No. 08/498,406, filed Jul. 5, 1995, now abandoned.

BACKGROUND OF THE INVENTION

1. Field of the Invention

The present invention relates to a waterproof rubber plug for sealing a clearance defined between a periphery of a wire and an inner periphery of a hole formed in a housing.

2. Description of the Related Art

A conventional waterproof rubber plug disclosed in Japanese Unexamined Utility Model Publication (Kokai) No. 62-163879. This waterproof rubber plug fits onto an outer periphery of a wire and inserted into a hole formed in a housing thereby sealing a clearance defined between the outer periphery of the wire and an inner periphery of the hole.

The waterproof rubber plug consists of a thick-walled main body part for closing the clearance defined between the outer periphery of the wire and the inner periphery of the hole of the housing and a thin-walled crimping part extending from a leading end of the main body part. Further, the waterproof rubber plug, which is cylindrically shaped, is provided at a center thereof with a hole for passing the wire therethrough.

The thin-walled crimping part for crimping a wire is secured to the wire by means of a crimping piece tightening against the outside of the wire. In general, this crimping piece is arranged in a wire-connecting terminal or the like at a rear end thereof. In order to facilitate insertion of the wire, the crimping part is formed so that a diameter of an internal periphery thereof is equal to or somewhat larger than an outer diameter of the wire.

On an inner surface of the main body part, annular projections are formed so as to be apart from each other at intervals in the inserting direction of the wire, providing corrugated cross-sectional lines. In arrangement, the annular projections are tightly brought into contact with the outer periphery of the wire. The through-hole of the rubber plug is provided at an inlet for the wire with a tapered surface for facilitating the insertion of the wire thereinto.

In the above-mentioned rubber plug, however, a clearance is apt to be produced between the wire and the annular projections inside of the rubber plug when the wire portion outside of the housing is bent obliquely. In such a case, water may intrude into an interior of the housing through the clearance produced. In particular, due to the tapered surface formed on the inner margin of the rubber plug, there is a possibility that water may stagnate in a recess defined by the wire and the tapered surface, so that the water may intrude into the interior of the housing via. the above clearance. This tendency of intrusion would be further enhanced in case of the wire having lesser diameters.

To cope with the above problem caused by the clearance, higher sealing capability is required against the fitting portion of the crimping part with the outer periphery of the wire. In the conventional plug, however, since the inner diameter of the crimping part is formed to be equal or somewhat larger than the outer diameter of the wire, it has been impossible to ensure the high sealing capability of the plug in this area.

SUMMARY OF THE INVENTION

It is therefore an object of the present invention to provide a waterproof rubber plug which is capable of sealing securely even in cases that there is a clearance between an inner periphery of the waterproof rubber plug and a wire on an insertion side thereof.

The object of the invention described above can be accomplished by a cylindrical waterproof rubber plug for insertion into a hole formed in a housing, the waterproof rubber plug being provided at a center thereof with a through-hole into which a wire is to be inserted and comprising:

a main body part to be fitted on the outer periphery of the wire to thereby to close a clearance defined between the outer periphery of the wire and the inner periphery of the housing; and a crimping part formed integral with the main body part, the crimping part being capable of being press-fitted from outside thereof, whereby the crimping part can be crimped on the outer periphery of the wire wherein the waterproof rubber plug is formed to complex with the following to equation:

$$(A-B)/B=0.1\text{–}0.8$$

where A is a dimension of outer diameter of the wire;

B is a dimension of inner diameter of the crimping part in a free state; and

A is larger than B.

In the arrangement mentioned above, when the wire extending outward of the housing is bent obliquely, there may be produced a clearance between the wire and the inner periphery of the waterproof rubber plug on its wire-insertion side. However, in even such a case, since the inner diameter of the crimping part and the outer diameter of the wire are established as above, a crimping distance in the crimping part is so increased that the tightness between an inner surface of the waterproof rubber plug and an outer surface of the wire is raised thereby to ensure the sealability in this area. Further, when wire is inserted by an automatic assembling machine, the ease of insertion can be maintained.

In the present invention, preferably, the dimensions A and B are established so as to meet the limitation of the following additional equation:

$$(A-B)/B=0.15\text{–}0.7.5$$

In such a case, the above-mentioned functions of the waterproof rubber plug can be further enhanced.

More preferably, the crimping part is provided on an inner periphery thereof with an annular projection of which minimum diameter corresponds to the dimension B. With this arrangement, a top portion of the annular projection can be tightly fitted on the outer periphery of the wire to thereby improve its sealability.

Further, it is preferable that the main body part is also provided on inner and outer peripheries thereof with annular projections each of which is axially apart from each other.

In this case, due to respective reduced area in the inner and outer surfaces of the waterproof rubber plug, which would be in contact with the wire and the housing, the ease of wire insertion into the plug and insertion of the plug into the housing can both be increased.

Furthermore, the main body part of the waterproof rubber plug is formed so that a maximum of outer diameter thereof is larger than an outer diameter of the crimping part.

These and other objects and features of the present invention will become more fully apparent from the following description and appended claims taken in conjunction with the accompanying drawings.

DESCRIPTION OF THE PREFERRED EMBODIMENTS

A first embodiment of the present invention is now described with reference to FIGS. 1–4.

Figure 1:
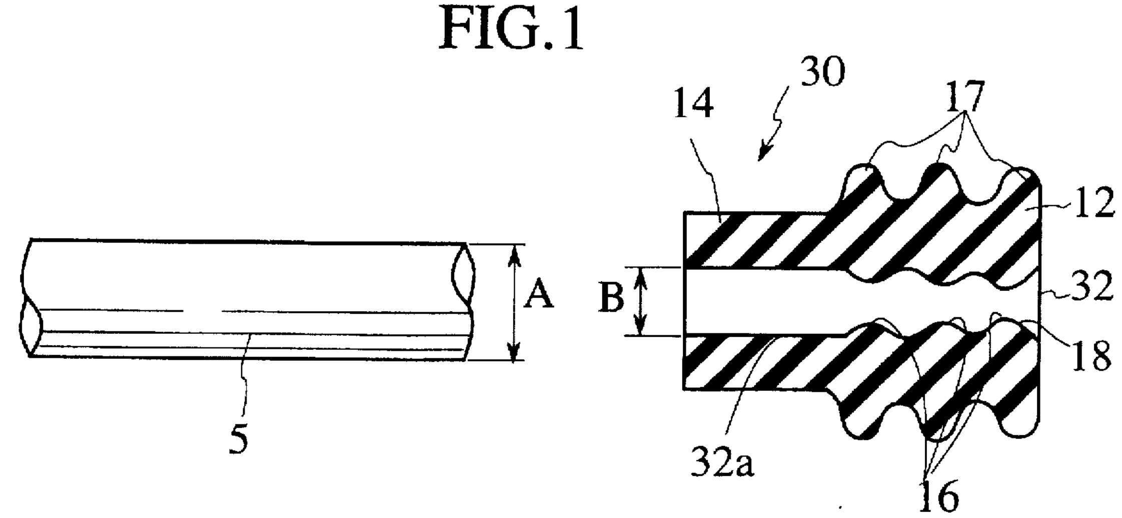
FIG. 1 is a cross sectional view of a waterproof rubber plug in accordance with an embodiment of the present invention, illustrating a dimensional relationship between the rubber plug and a wire to be fitted therein.
Figure 2:
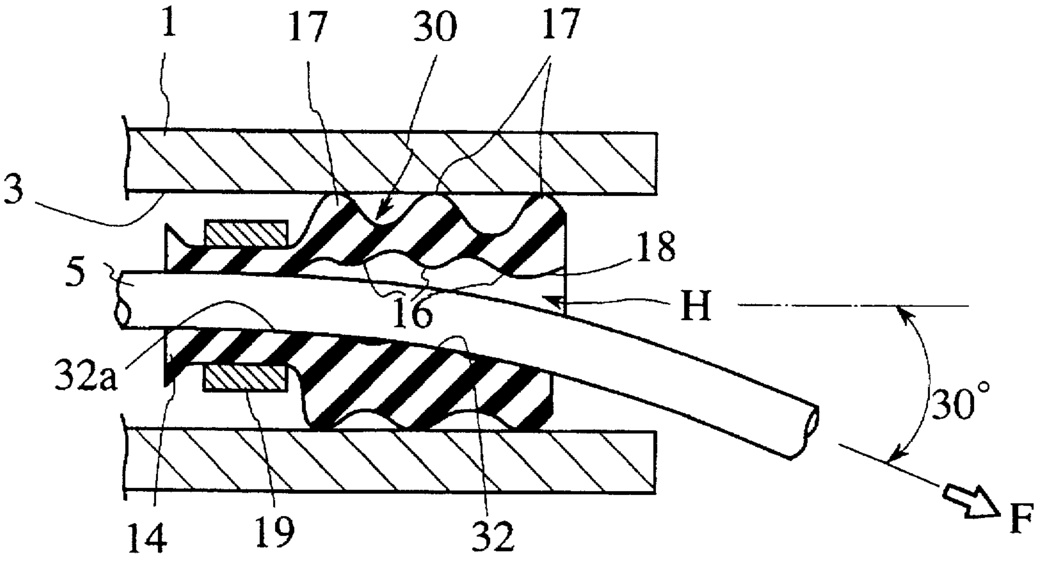
FIG. 2 is a cross sectional view of the waterproof rubber plug of FIG. 1 and a housing on use.

FIG. 1 is a cross sectional view of a waterproof rubber plug 30 in accordance with an embodiment of the present invention. FIG. 1 also illustrates a wire 5 to be fitted to the rubber plug 30, indicating a dimensional relationship therebetween. FIG. 2 is a cross sectional view showing a condition under which the waterproof rubber plug 30 having the wire 5 fitted therein is inserted into a hole 3 of the housing 1.

Similar to the conventional waterproof rubber plug, the waterproof rubber plug 30 of the invention includes a thick-walled main body part 12 for closing the clearance defined between the outer periphery of the wire 5 and the inner periphery of the hole 3 of the housing 1 and a thin-walled crimping part 14 extendedly formed at a leading end of the main body part 12. Further, the waterproof rubber plug 30, which is shaped to be cylindrical, is provided at a center thereof with a through-hole 32 for passing the wire 5 therethrough.

According to the present invention, an inner periphery 32*a* of the through-hole 32 at the crimping part 14 is formed to have a dimension different from that of the conventional rubber plug. That is, providing that the outer diameter of the wire 5 is represented by "A" and that an inner diameter of the crimping part 14 in a free state is represented by "B", the respective dimensions A and B (A>B) is established to meet a following relationship;

$$(A-B)/B=0.1\sim0.8 \ldots \quad (1)$$

The so-constructed waterproof rubber plug 30 operates as follows.

In using the waterproof rubber plug 30, a leading end of the wire 5 is inserted into the through-hole 32 of the plug 30 by an automatic assembling machine (not shown). An upper value of insertion force by the machine will be approximately from 200 to 300 gf.

After engaging the waterproof rubber plug 30 on the outer periphery of the wire 5, a wire connecting terminal (not shown) is crimped at the leading end of the wire 5 and simultaneously, the crimping part 14 of the plug 30 is lapped in a crimping piece 19 formed at a rear end of the wire connecting terminal. Then, by crimping the crimping piece 19 using a press-fitting machine (not shown), the crimping part 14 is fixed to the outer periphery of the wire 5.

Next, under such a condition, the leading end of the wire 5 and the waterproof rubber plug 30 are inserted into the hole 3 of the housing 1. By this insertion, the annular projections 18 on the inner periphery of the main body part 12 are strongly fitted on the outer periphery of the wire 5 and annular projections 17 formed on the outer periphery. Additionally, main body part 12 is strongly fitted within the inner periphery of the hole 3 of the housing 1, whereby the clearance between the wire 5 and the hole 3 in the housing 1 can be closed.

In the waterproof rubber plug 30 of the first embodiment, since the outer diameter A of the wire 5 and the inner diameter B of the crimping part 14 of the waterproof rubber plug 30 are established as described above, the sealing performance can be maintained by the crimping part 14 even if a clearance H is produced between the inner periphery of the plug 30 on the wire-insertion side and the outer periphery of the wire 5 by obliquely bending the wire 5 extending outward of the housing 1 as shown in FIG. 2.

Figures 3, 4:
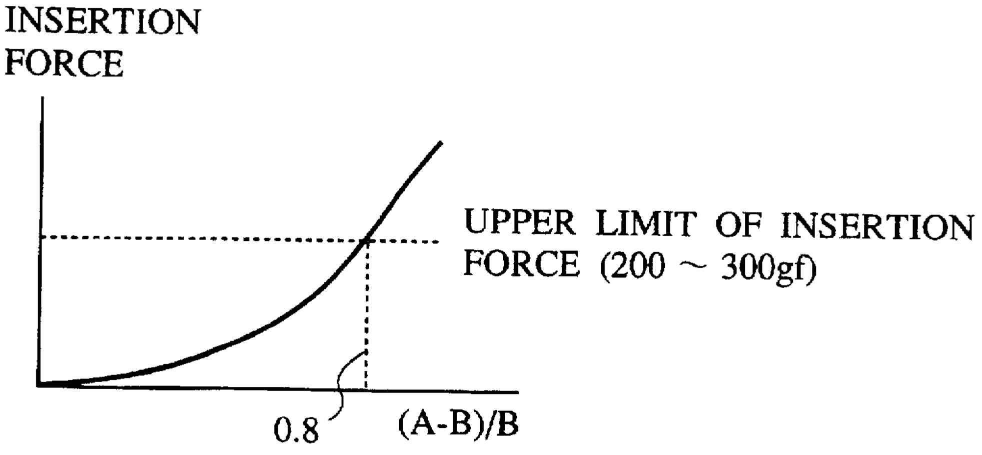
FIG. 3 is a chart illustrating an effectiveness of numerical limitations in accordance with one embodiment of the present invention.
FIG. 4 is a graph illustrating the effectiveness of numerical limitations in accordance with one embodiment of the present invention.

In FIG. 3, there is shown an examination result of relationships between the sealing capability (i.e. sealability) and the easiness in inserting the wire under condition that the value of (A–B)/B is varied. Additionally, FIG. 4 shows a relationship between the insertion force in inserting the wire and the value of (A–B)/B. It is noted that the shown upper limit of the insertion force is an upper value of insertion force by the automatic assembling machine. In order to examine the sealability, the wire 5 has been pulled in the direction of an oblique angle of 30° by the force of 30N, as shown in FIG. 2. Under such a condition, the air has been brown at a rear end of the waterproof rubber plug 30 while the quality of sealability has been judged by investigating its blow-by condition of air.

From these figures, it will be understood that, if the value of (A–B)/B is established following the above equation (1) a constant effect can be expected. That is, when the value of (A–B)/B becomes to be more than 0.8, the easiness of insertion by the automatic assembling machine grows worse and when the value is less than 0.1, the sealability becomes to be insufficient. Consequently, it will be understood that a range expressed by the above equation (1) becomes an allowable range. More preferably, in order to stand together the sealability and the easiness in inserting the wire, it is effective to establish the value of (A–B)/B as follows:

$$(A-B)/B=0.15\sim0.75 \ldots \quad (2)$$

Note that, on the occasion of establishing the inner diameter B of the crimping part 14 so as to meet the equations (1) and (2), it would be appropriate if only applying the selected value of B on an inner diameter of a part of inner periphery of the crimping part 14.

Figure 5:
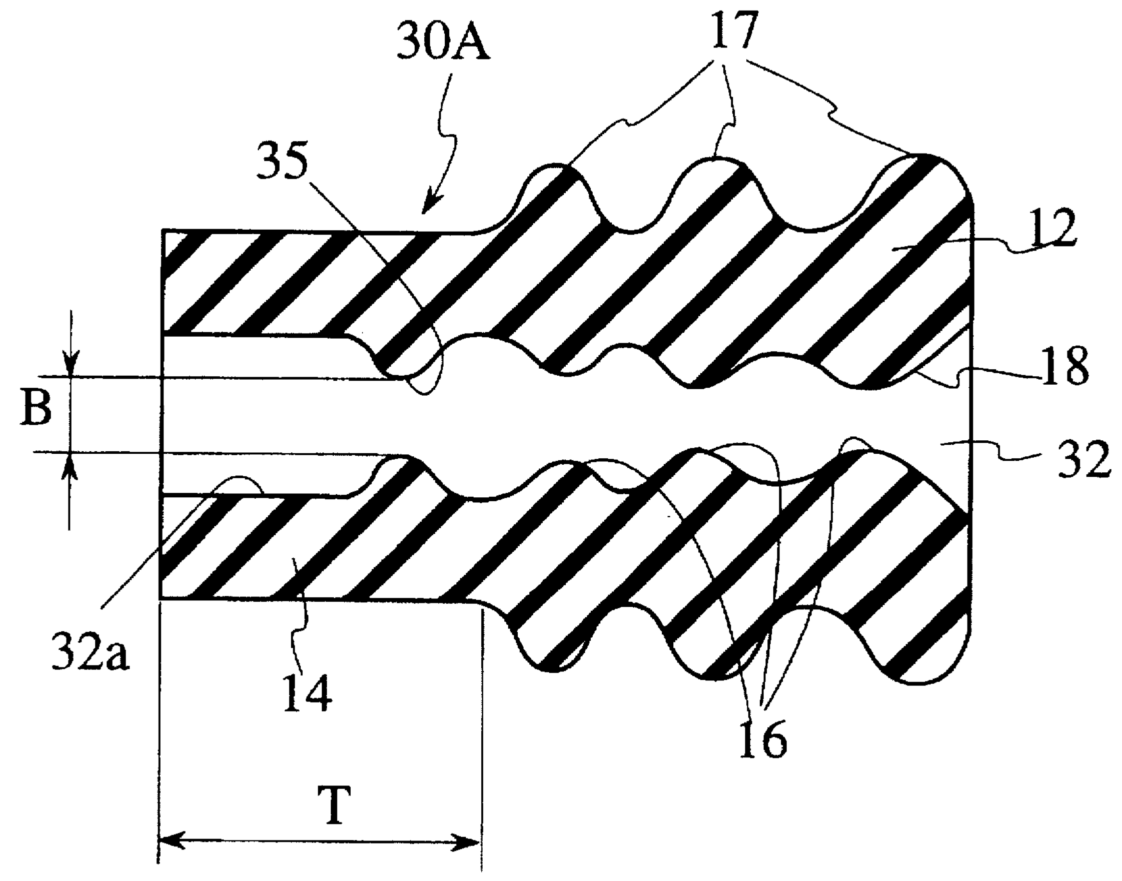
FIG. 5 is a perspective view showing a waterproof rubber plug in accordance with another embodiment of the present invention.

FIG. 5 is a cross-sectional view of a waterproof rubber plug in accordance with another embodiment of the present invention. Note, in the figure, elements similar to those in the previous embodiment are indicated by same reference numerals.

In the second embodiment, a waterproof rubber plug 30A is provided on an inner periphery of the crimping part 14 with an annular projection 35 of which minimum diameter corresponds to the above-mentioned dimension B. In this case, the annular projection 35 must be arranged within an extent of the width T of the crimping piece 19 (see FIG. 2).

As mentioned above, according to the embodiment of the present invention, since the waterproof rubber plug is formed to meet the equation "(A–B)/B=0.1~0.8", it is possible to stand the easiness in inserting the wire and the sure sealability of the plug, together.

In addition, when the dimensions A and B are established so as to meet the equation of "(A–B)/B=0.15~0.75", the above effects can be further enhanced.

According to the embodiment in which the crimping part is provided on the inner periphery with the annular projection of which minimum diameter corresponds to the dimension B, the easiness in inserting the wire into the plug can be improved if only the minimum inner diameter of the annular projection is decreased. Further, since the contact area of the crimping part on the wire can be decreased, the contact pressure thereon can be raised in comparison with the conventional plug having no projection, whereby the sealability of the plug itself can be improved under the same crimping condition as the conventional.

Finally, it will be understood by those skilled in the art that the foregoing description of the preferred embodiments of the disclosed structure are exemplary, and that various changes and modifications may be made to the present invention without departing from the spirit and scope thereof.

What is claimed is:

1. A waterproof rubber plug structure for forming a fluid tight seal, the plug structure comprising, in combination:

a wire having an outer diameter A;

a crimping piece forming part of a wire connecting terminal;

a housing having a hole formed therein; and a waterproof rubber plug for forming a fluid-tight seal between the wire and the housing, said plug including:

a main body part;

a crimping part having an axial length and engageable by the crimping piece, the crimping part being adjacent to the main body part; and a channel extending through both the crimping part and the main body part;

wherein the crimping part has an annular projection extending into the channel and positioned along the axial length of the crimping part to underlie the crimping piece engaging the crimping part;

wherein the annular projection of the crimping part in a free state has an inner diameter B, smaller than the outer diameter A of the wire; and wherein the diameters A and B are related by the equation (A–B)/B=0.1 to 0.8.

2. A waterproof rubber plug structure as claimed in claim 1, wherein diameter A and diameter B are further related by the equation:

$$(A-B)/B=0.15 \text{ to } 0.75$$

3. A waterproof rubber plug structure as claimed in claim 2, wherein said main body part also includes axially spaced annular projections on inner and outer peripheries thereof.

4. A waterproof rubber plug structure as claimed in claim 3, wherein said main body part is formed so that a maximum of outer diameter thereof is larger than an outer diameter of said crimping part.

* * * * *